United States Patent [19]

Sakaegi et al.

[11] Patent Number: 5,508,813
[45] Date of Patent: Apr. 16, 1996

[54] IMAGE SIGNAL PROCESSING APPARATUS HAVING FIRST-IN FIRST-OUT MEMORY

[75] Inventors: Yuji Sakaegi; Eiji Ohara, both of Kanagawa, Japan

[73] Assignee: Canon Kabushiki Kaisha, Tokyo, Japan

[21] Appl. No.: 458,234

[22] Filed: Jun. 19, 1995

Related U.S. Application Data

[63] Continuation of Ser. No. 386,213, Feb. 9, 1995, abandoned, which is a continuation of Ser. No. 26,495, Mar. 4, 1993, abandoned.

[30] Foreign Application Priority Data

Mar. 10, 1992 [JP] Japan ..................... 4-051708

[51] Int. Cl.[6] .................................... H04N 9/79
[52] U.S. Cl. .................... 358/310; 358/335; 360/33.1; 360/35.1
[58] Field of Search .................. 358/335, 310; 348/458, 459, 441; 360/33.1, 35.1; H04N 5/76, 9/79

[56] References Cited

U.S. PATENT DOCUMENTS

| | | | |
|---|---|---|---|
| 5,157,490 | 10/1992 | Kawai et al. | 358/140 |
| 5,177,610 | 1/1993 | Wilkinson | 358/140 |
| 5,218,452 | 6/1993 | Kondo et al. | 360/35.1 |
| 5,291,469 | 3/1994 | Yoshinaka | 358/310 |

*Primary Examiner*—Tommy P. Chin
*Assistant Examiner*—Khoi Truong
*Attorney, Agent, or Firm*—Robin, Blecker, Daley & Driscoll

[57] ABSTRACT

An image signal processing apparatus for processing an image signal composed of a luminance signal and a chrominance signal is provided with a first-in first-out memory which is capable of storing the image signal for one field. The apparatus is arranged such that, in writing or reading the image signal into or from the first-in first-out memory, the image signal writing and reading actions on the first-in first-out memory are reset at intervals of a horizontal scanning period of the image signal. This arrangement enables the apparatus to carry out various signal processing actions by delaying the image signal without using any delay element exclusively for the process of delaying the image signal which is necessary for the various signal processing actions.

4 Claims, 5 Drawing Sheets

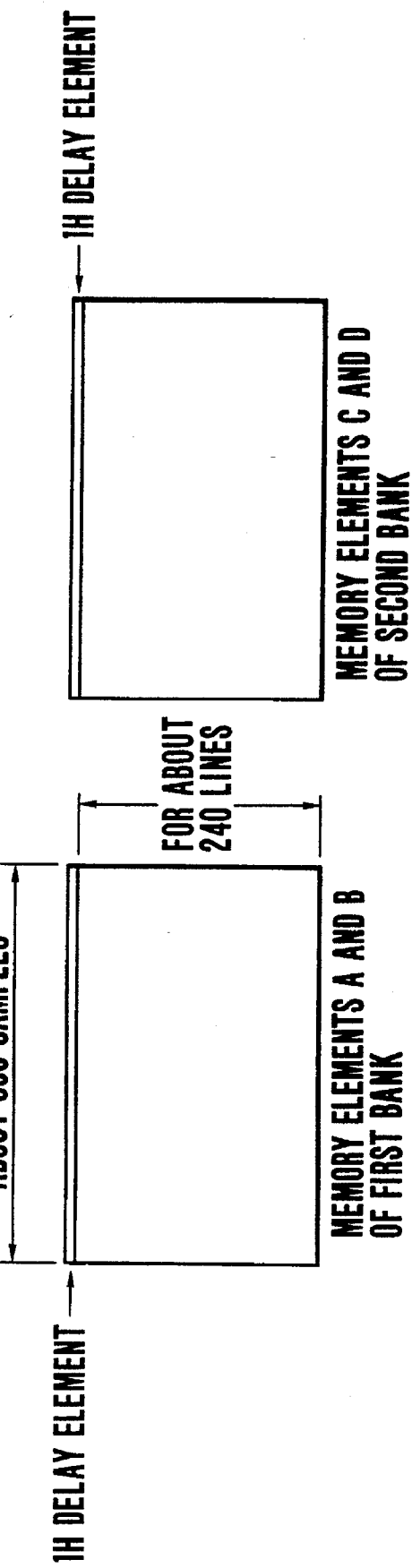

IMAGE SIGNAL PROCESSING APPARATUS HAVING FIRST-IN FIRST-OUT MEMORY

This is a continuation application under 37 CFR 1 62 of prior application Ser. No. 08/386,213, filed Feb. 9, 1995, now abandoned which is a continuation of Ser. No. 08/026,495, filed Mar. 4, 1993, abandoned.

This invention relates to an image signal processing apparatus arranged to process an image signal

BACKGROUND OF THE INVENTION

1. Field of the Invention composed of a luminance signal and a chrominance signal.

2. Description of the Related Art

An electronic still video system has been known as one of the image signal processing apparatuses of the kind arranged to process an image signal composed of luminance and chrominance signals. The electronic still video system is arranged to record a still image signal for one field or one frame in circular tracks which are concentrically formed on a magnetic disc called a video floppy disc. The still image signal for one field is recorded in one track. The still image signal for one frame is recorded consecutively in two tracks on the video floppy disc. The still video system is further arranged to reproduce the image signal recorded on the video floppy disc and either to display the reproduced still image on a TV monitor device or to have it printed in a hard copy by a printer device.

In recording the image signal composed of luminance and chrominance signals, the luminance signal is frequency-modulated into a high-frequency band. As for the chrominance signal, two kinds of color-difference signals R-Y and B-Y are converted into a line-sequential color-difference signal. After that, the line-sequential color-difference signal is frequency-modulated into a low-frequency band. The frequency-modulated luminance signal and the frequency-modulated line-sequential color-difference signal are frequency-multiplexed into a recording image signal to be recorded on the video floppy disc. In reproducing the image signal recorded, the signal reproduced from the video floppy disc is processed to extract the frequency-modulated luminance signal and the frequency-modulated line-sequential color-difference signal. The extracted signals are frequency-demodulated. After the frequency demodulation, the line-sequential color-difference signal is subjected to a simultaneous rearrangement process for converting it into two simultaneous color-difference signals. After that, the two color-difference signals are converted into a chrominance signal through a quadrature two-phase modulation process. Then, the frequency-demodulated luminance signal and the chrominance signal thus obtained are frequency-multiplexed into a video signal which conforms, for example, to the NTSC television system. The video signal thus obtained is supplied to a TV monitor device or to a printer device.

The electronic still video system has a mode called a field reproduction mode. In the field reproduction mode, an image signal for one field recorded in one track on the video floppy disc is reproduced, then an image signal for one frame, i.e., for two fields, is formed from the reproduced image signal for one field, and the image signal for one frame thus formed is supplied to a TV monitor device or to a printer device. In the case of the field reproduction mode, the image signal for one frame composed of two field signals includes an image signal for one field which corresponds to the image signal for one field reproduced from the video floppy disc (hereinafter referred to as a reproduced field image signal) and an image signal for the other field which is formed from the reproduced field image signal (hereinafter referred to as an interpolation field image signal). In a case where the reproduced field image signal obtained from the video floppy disc is displayed on a TV monitor device in forming the interpolation field image signal, the interpolation field image signal is formed by a process called a field interpolation process by taking the arithmetic mean of image signals corresponding to a plurality of horizontal scanning lines which adjacently appear on the display image plane of the monitor device. Further, a process called a skew correction process is carried out for correcting a time deviation of ½ H (H: a horizontal scanning period) between the image signal of a field which consists of odd-number-th horizontal scanning lines and the image signal of a field which consists of even-number-th horizontal scanning lines, which are formed by the field interpolation process.

Further, the electronic still video system is arranged to carry out a process called a dropout compensation process to make compensation for a signal dropout if any signal dropout takes place in reproducing the image signal recorded on the video floppy disc.

In carrying out the simultaneous rearrangement process for the line-sequential color-difference signal, the dropout compensation process at the time of reproduction and also the field interpolation process and the skew correction processes in the case of field reproduction mode, it is necessary for the electronic still video system to delay the image signal as much as one horizontal scanning period. For this purpose, delay elements of varied kinds, such as a glass delay line, a CCD (charge coupled device), etc., have been employed by the conventional still video system.

Meanwhile, an electronic still video system of the following kind has recently come to be considered: This system includes a DRAM (dynamic random access memory) which is capable of storing an image signal for one field or one frame and permits a random access to any desired digital image signal stored by designating the address of the digital image signal. At the time of reproduction, the video floppy disc is driven to rotate by a motor. An image signal for one field (or for one frame) reproduced is digitized. The digital image signal is stored in the DRAM. After that, the rotative driving action of the motor is stopped. The digital image signal stored in the DRAM is repeatedly read out for every one field (or frame) period. The digital image signal read out is converted into an analog signal and outputted. This arrangement effectively lowers the power consumption of the reproducing operation of the system.

Another advantage of the electronic still video system having the DRAM lies in that: After the image signal reproduced from the video floppy disc is stored in the DRAM at the time of reproduction, any desired image signal is accessible by address designation as mentioned above. The use of the DRAM enables the still video system to carry out, without recourse to the above-stated various delay elements such as a glass delay line or a CCD, the simultaneous rearrangement process on the line-sequential color-difference signal and the dropout compensation process which are necessary for reproduction and the field interpolation process and the skew correction process which are necessary in the field reproduction mode.

More specifically, with respect to the dropout compensation process, for example, in reading the image signal stored in the DRAM, an image signal of an address for a horizontal scanning period which is one horizontal scanning period before or after an address corresponding to a period during which a dropout takes place during the process of reproduction is read out in place of the dropout. As to the simultaneous rearrangement process on the line-sequential color-difference signal, the process can be carried out by simultaneously reading out the signals of two different addresses deviating as much as one horizontal scanning period from each other in reading out the line-sequential color-difference signal stored in the DRAM.

However, the DRAM which is arranged to be capable of storing a digitized image signal for one field (or for one frame) and to permit a random access to a desired digital image signal by designating the address of the digital image signal stored necessitates signal writing or reading to be carried out at a high speed, whereas a DRAM for universal purposes permits signal writing or reading only at a slow speed. In order to carry out signal writing or reading at a high speed, the signal writing or reading must be carried out by parallel processing. The parallel processing necessitates use of a plurality of DRAMs, which makes the structural arrangement of the system complex and thus makes reduction in size and weight of the system difficult.

Further, the electronic still video system may be arranged to use a dual port DRAM which permits signal writing or reading at a high speed. However, the dual port DRAM is very expensive. The use of the dual port DRAM, therefore, causes an increase in cost.

SUMMARY OF THE INVENTION

It is a general object of this invention to provide an image signal processing apparatus which is capable of solving the above-stated problems.

It is a more specific object of the invention to provide an image signal processing apparatus which is capable of carrying out various signal processing actions despite its low-cost, simple arrangement.

Under this object, an image signal processing apparatus arranged as an embodiment of this invention to process an image signal comprises a first-in first-out memory arranged to be capable of storing the image signal for every field, and memory control means arranged to reset an image signal storing or reading action on the first-in first-out memory at intervals of a horizontal scanning period of the image signal, when storing the image signal in the first-in first-out memory or when reading out the image signal stored in the first-in first-out memory.

It is another object of the invention to provide an image signal reproducing apparatus which is capable of carrying out various reproduced signal processing actions despite the low-cost, simple arrangement thereof.

Under that object, an image signal reproducing apparatus arranged as an embodiment of this invention to reproduce an image signal from a recording medium on which the image signal is recorded for every field comprises reproducing means arranged to reproduce the image signal recorded on the recording medium for every field and to output the reproduced image signal, a first-in first-out memory arranged to be capable of storing the image signal outputted for every field from the reproducing means, and memory control means arranged to reset an image signal storing or reading action on the first-in first-out memory at intervals of a horizontal scanning period of the image signal, when storing the image signal outputted from the reproducing means in the first-in first-out memory or when reading out the image signal stored in the first-in first-out memory.

It is a further object of the invention to provide an image signal reproducing apparatus which is capable of carrying out, despite its low-cost simple arrangement, a dropout compensation process by delaying an image signal without necessitating use of any delay element exclusively for the process of delaying the image signal which is necessary in carrying out the dropout compensation process.

Under the above-stated object, an image signal processing apparatus arranged as an embodiment of this invention to process an image signal comprises a first-in first-out memory arranged to be capable of storing an image signal for one field, and dropout compensation process means for compensating any dropout occurring in the image signal by using the image signal stored in the first-in first-out memory, when reading out the image signal stored in the first-in first-out memory after the image signal is temporarily stored in the first-in first-out memory.

It is a further object of this invention to provide an image signal processing apparatus which is capable of carrying out, despite its low-cost simple arrangement, a simultaneous rearrangement process on a line-sequential color-difference signal included in an image signal by delaying the image signal without necessitating use of any delay element exclusively for the process of delaying the image signal which is necessary for the simultaneous rearrangement process.

Under this object, an image signal processing apparatus arranged as an embodiment of this invention to process an image signal including a luminance signal and a line-sequential color-difference signal comprises a first-in first-out memory arranged to be capable of storing an image signal for one field, and simultaneous rearrangement process means for carrying out a simultaneous rearrangement process for converting the line-sequential color-difference signal included in the image signal into two simultaneous color-difference signals by using the image signal stored in the first-in first-out memory, when reading out the image signal stored in the first-in first-out memory after the image signal is temporarily stored in the first-in first-out memory.

It is a still further object of this invention to provide an image signal processing apparatus which is capable of carrying out, despite its low-cost simple arrangement, an interpolation process by delaying an image signal without necessitating use of any delay element exclusively for the process of delaying the image signal which is necessary for the interpolation process.

Under this object, an image signal processing apparatus arranged as an embodiment of this invention to process an image signal comprises a first-in first-out memory arranged to be capable of storing an image signal for one field, and interpolation process means arranged to form an image signal for one frame from the image signal for one field by carrying out an interpolation process by using the image signal stored in the first-in first-out memory, when reading out the image signal stored in said first-in first-out memory after the image signal is temporarily stored in the first-in first-out memory.

The above and other objects and features of the invention will become more apparent from the following detailed description of an embodiment thereof taken in conjunction with the accompanying drawings.

BRIEF DESCRIPTION OF THE DRAWINGS

FIG. 5 shows a memory map of the FIFO memory 18 shown in FIG. 1.

DETAILED DESCRIPTION OF THE PREFERRED EMBODIMENT

Figure 1:
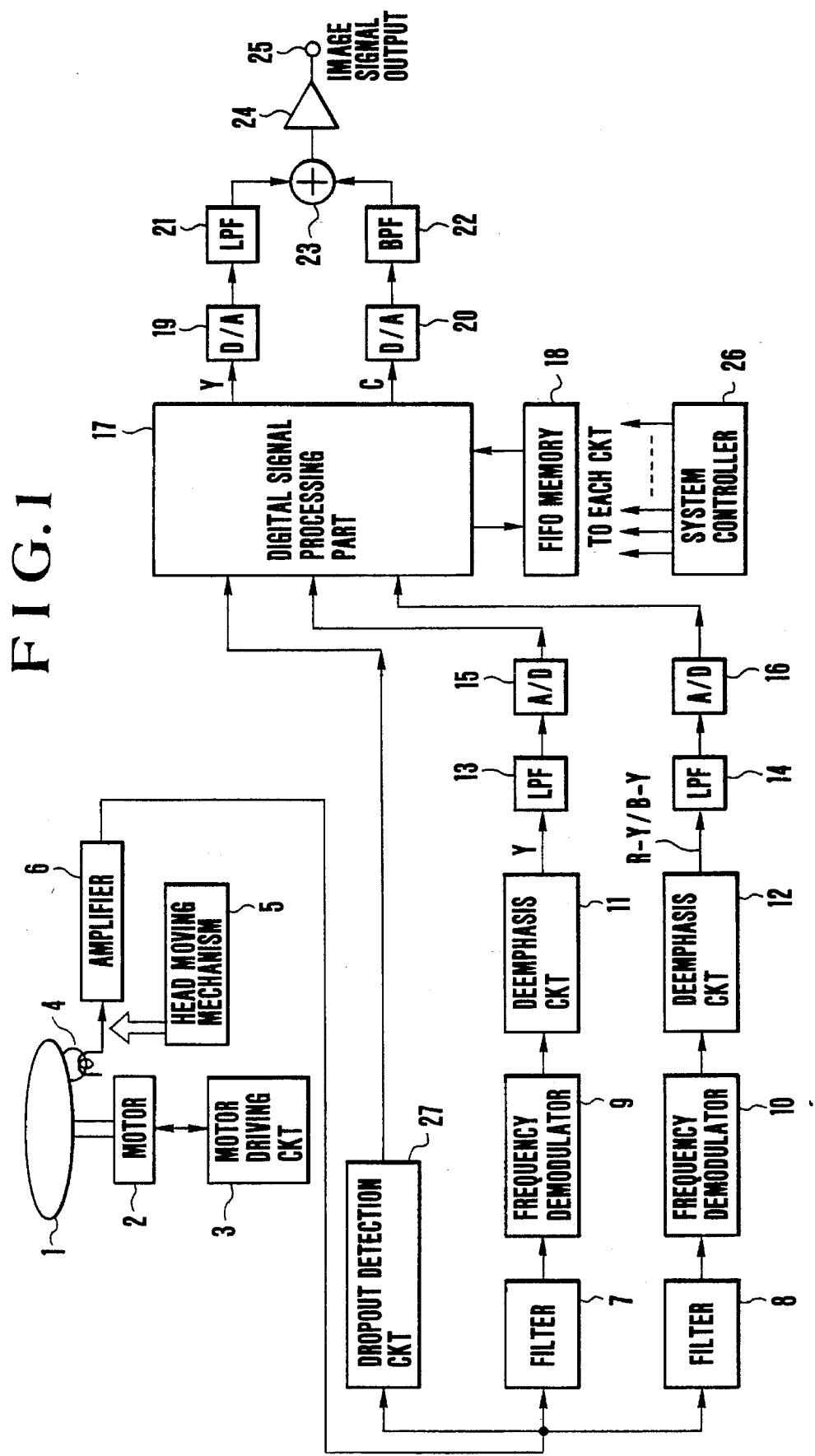
FIG. 1 is a block diagram showing in outline the arrangement of a reproducing apparatus included in an electronic still video system which is arranged according to this invention as an embodiment thereof.

This invention is described in detail through an embodiment thereof as follows:

FIG. 1 is a block diagram showing in outline the arrangement of a reproducing apparatus included in an electronic still video system which is arranged according to this invention as an embodiment thereof. In the following description, an image signal for one frame is assumed to be reproduced from a video floppy disc on which the image signal for one frame (composed of two fields) is recorded, in a frame recording mode, in two adjacent tracks among a plurality of circular tracks concentrically formed on the disc with an image signal for one field recorded in each of the adjacent tracks.

Referring to FIG. 1, the video floppy disc 1 which is mounted on the apparatus is rotated by a motor 2 which is driven by a motor driving circuit 3 in accordance with an instruction from a system controller 26. Any desired pair of adjacent tracks in which an image signal for one frame is recorded among a plurality of circular tracks formed concentrically on the video floppy disc 1 are designated by operating an operation part which is not shown. With the adjacent pair of tracks thus designated, a magnetic head 4 is moved by a head moving mechanism 5 onto one of the two tracks which is located on the outer side of the disc. Then, an image signal recorded for a first field is reproduced by the magnetic head 4.

The signal thus reproduced by the magnetic head 4 is amplified by a amplifier 6. The amplified reproduced signal is supplied to a frequency-modulated luminance signal separating filter 7 and a frequency-modulated line-sequential color-difference signal separating filter 8. The reproduced signal is separated by these filters 7 and 8 into a frequency-modulated luminance signal and a frequency-modulated line-sequential color-difference signal. These signals are supplied respectively to frequency demodulators 9 and 10 to be frequency demodulated. The frequency-demodulated signals are supplied respectively to deemphasis circuits 11 and 12 to be subjected to a deemphasis process which is of a characteristic reverse to an emphasis process performed at the time of recording. After the deemphasis process, these signals are supplied respectively to low-pass filters (LPFs) 13 and 14 to remove unnecessary frequency components. After the LPFs, these signals are supplied respectively to A/D (analog-to-digital) converters 15 and 16 to be digitized into digital luminance data and digital line-sequential color-difference data, which are inputted to a digital signal processing part 17.

At the digital signal processing part 17, the digital luminarice data input and the digital line-sequential color-difference data input are written into an FIFO (first-in first-out) memory 18. After that, the magnetic head 4 is moved by the head moving mechanism 5 onto the other of the two adjacent tracks located on the inner side of the disc. An image signal recorded for a second field is reproduced by the magnetic head 4. The reproduced image signal of the second field is processed, in the same manner as the image signal of the first field, to obtain digital luminance data and digital line-sequential color-difference data. At the digital signal processing part 17, these data inputs are also written into the FIFO memory 18. Then, a digital signal processing operation is performed by using the data thus written in the FIFO memory 18 in a manner as will be described later herein. Through the digital signal processing operation, the digital signal processing part 17 forms digital luminance data and digital chrominance data corresponding to the first field and digital luminance data and digital chrominance data corresponding to the second field. The digital data corresponding to the first field and to the second field are alternately and serially outputted separately for each field period.

The digital luminance data and the digital chrominance data which are thus alternately outputted one after another separately for each field period from the digital signal processing part 17 are converted into analog signals by D/A (digital-to-analog) converters 19 and 20. The analog signal outputs of the D/A converters 19 and 20 are supplied respectively to an LPF 21 and a band-pass filter (BPF) 22 to remove their unnecessary frequency components. The outputs of the LPF 21 and the BPF 22 are supplied to an adder 23 to be frequency-multiplexed. The thus frequency-multiplexed signal is outputted from an output terminal 24 through a buffer amplifier 24 to an external device, such as a TV monitor device.

Figure 2:
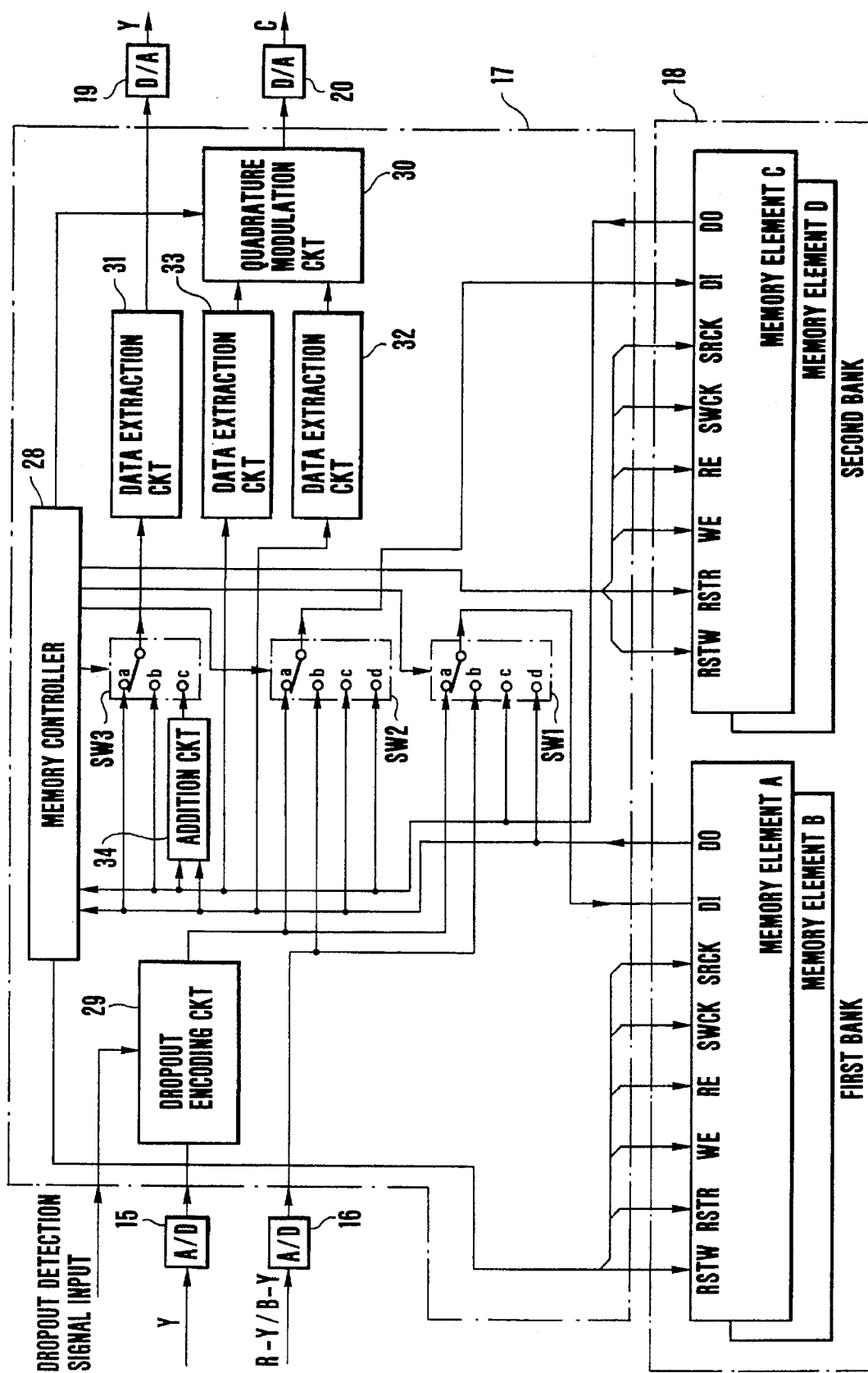
FIG. 2 is a block diagram showing in detail the arrangement of a digital signal processing part 17 and an FIFO (first-in first-out) memory 18 of the apparatus of Fig.1.

FIG. 2 is a block diagram showing in detail the arrangement of the digital signal processing part 17 and that of the FIFO memory 18 shown in FIG. 1.

Referring to FIG. 2, the FIFO memory 18 is composed of four FIFO type memory elements which are, for example, the products (TMS4C1050) of Texas Instruments Inc. Memory elements A and B are together called the first bank and are used for storing an image signal of the first field. Memory elements C and D are called the second bank and are used for storing an image signal of the second field.

Each of the memory elements of the FIFO memory 18 has a storage capacity of storing 262×262 samples of data, each consisting of four bits. Each of the memory elements is discretely provided, as shown in FIG. 2, with a data input terminal DI and a data output terminal DO. The memory element is in a data writing state or in a data reading state for a period of time during which a signal supplied from a memory controller 28 to a data writing control terminal WE or to a data reading control terminal RE is at a high level, respectively. In the case of the data writing state, data inputted to the input terminal DI is written in synchronism with a clock pulse signal which is supplied to a data writing clock terminal SWCK. If the memory element is in the data reading state, stored data is read out in synchronism with a clock pulse signal supplied to a data reading clock terminal SRCK (FIG. 2) and is outputted from the terminal DO.

The data writing/reading cycle of each of these memory elements is 30 nanoseconds, thus showing a very high speed. Further, a reset pulse signal is arranged to be applied to a reset-write terminal RSTW and to a reset-read terminal RSTR (shown in FIG. 2) at a timing which will be described later herein. This arrangement renders each of the memory elements usable as a 1H delay element for delaying input data by one horizontal scanning period (hereinafter referred to as a 1H).

The writing/reading action for writing and reading into and from the FIFO memory 18 an image signal for one frame reproduced from the video floppy disc 1 and the digital processing action to be performed at the digital signal processing part 17 are described with reference to FIGS. 1 and 2 as follows:

At the A/D converters 15 and 16, the luminance signal and the line-sequential color-difference signal supplied from the LPFs 13 and 14 are respectively sampled at a sampling rate of frequency (4 fsc=14.3 MHz) which is four times as high as a color subcarrier frequency fsc (=3.58 MHz). As a result, digital luminance data of 8 bits and digital line-sequential color-difference data of 8 bits are serially outputted for every 70 nanoseconds.

Figure 3:
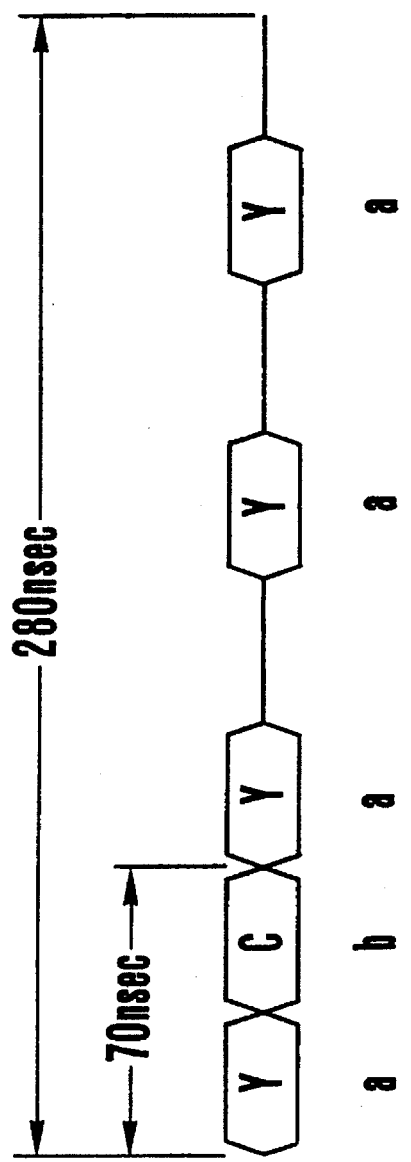
FIG. 3 is a timing chart showing a data writing action on the FIFO memory 18 shown in FIG. 1.

In writing into the FIFO memory 18 the digital luminance data Y and the digital line-sequential color-difference data R-Y/B-Y which correspond to the image signal of the first field reproduced from the video floppy disc 1, a switch SW1 shown in FIG. 2 is connected to contacts "a" and "b" one after another in accordance with an instruction from the memory controller 28 and according to the timing of FIG. 3 which is a timing chart. Through this switching action, the digital luminance data Y of 8 bits outputted from the A/D converter 15 are written into the memory element A and the other memory element B of the first bank of the FIFO memory 18 respectively by 4 bits within a period of 35 nanoseconds, and the digital line-sequential color-difference data R-Y/B-Y of 8 bits outputted from the A/D converter 16 are written also into the memory elements A and B of the first bank of the FIFO memory 18 also by 4 bits, respectively, within a period of 35 nanoseconds.

Upon completion of writing the image signal of the first field reproduced from the video floppy disc 1 into the memory elements A and B of the first bank of the FIFO memory 18, the system controller 26 instructs, as mentioned above, the head moving mechanism 5 to move the magnetic head 4 to the other track located on the inner side of the video floppy disc 1. The magnetic head 4 then reproduces the image signal of the second field recorded in the track. In writing into the FIFO memory 18 the digital luminance data Y and the digital line-sequential color-difference data R-Y/B-Y corresponding to the image signal of the second field reproduced from the video floppy disc 1, a switch SW2 is connected to its contacts "a" and "b" (see FIG. 2) one after another at the timing of FIG. 3 in accordance with an instruction given from the memory controller 28. By this switching action, the digital luminance data Y and the digital line-sequential color-difference data R-Y/B-Y of the second field which are outputted from the A/D converters 15 and 16 are written into the memory elements C and D of the second bank of the FIFO memory 18 in the same manner as the data of the first field.

Upon completion of writing into the FIFO memory 18 the image signal for one frame reproduced from the video floppy disc 1, the system controller 26 instructs the motor driving circuit 3 to stop the rotation of the video floppy disc 1 by stopping its driving action on the motor 2. The sampling rate of the digital line-sequential color-difference data R-Y/B-Y written into the FIFO memory 18 is 3.58 MHz which is ¼ of the sampling rate of the digital luminance data Y.

Further, as shown in FIG. 1, the reproducing apparatus of this embodiment of the invention includes a dropout detecting circuit 27, which is arranged to find if any dropout has occurred in the signal reproduced from the video floppy disc 1 and to generate a dropout detection signal for a period during which a dropout is detected. Meanwhile, the digital signal processing part 17 includes, as shown in FIG. 2, a dropout encoding circuit 29 which is arranged as follows: For the period during which the dropout detection signal is supplied from the dropout detecting circuit 27, the dropout encoding circuit 29 changes the value the digital luminance data Y of 8 bits outputted from the A/D converter 15 to a hexadecimal value of "0FFH" which corresponds to a case where the 8 bits of the data are all "1". Further, for any period during which the dropout detection signal is not supplied, the value of the digital luminance data Y outputted from the A/D converter 15 is changed to "0FEH" if the value of the data Y indicates "0FFH" and is not changed to allow it to be outputted as it is if the data Y indicates any value other than "0FFH". The digital luminance data Y which is thus processed and outputted from the dropout encoding circuit 29 is written into the FIFO memory 18.

Upon completion of writing the image signal for one frame into the FIFO memory 18 in the manner described, reading from the FIFO memory 18 begins. Then, after completion of a digital signal processing operation which will be described hereinafter, digital luminarice data Y for one frame is outputted from a switch SW3 while digital chrominance data C for one frame is outputted from a digital quadrature modulation circuit 30. The data Y and the data C are supplied respectively to the D/A converters 19 and 20.

The details of the digital signal processing operation of the reproducing apparatus of this embodiment are described as follows: In reading out the image signal for one field written in the memory element of one of the banks of the FIFO memory 18 after completion of writing the image signal for one frame into the FIFO memory 18, the memory element of the other bank is caused to act as a one-horizontal-scanning-period (hereinafter referred to as 1H) delay element. By using this 1H delay element, a dropout compensation process, a simultaneous rearrangement process on the line-sequential color-difference signal and an interpolation process for forming an image signal for one frame from the image signal for one field are carried out by digital processing.

Figure 4:
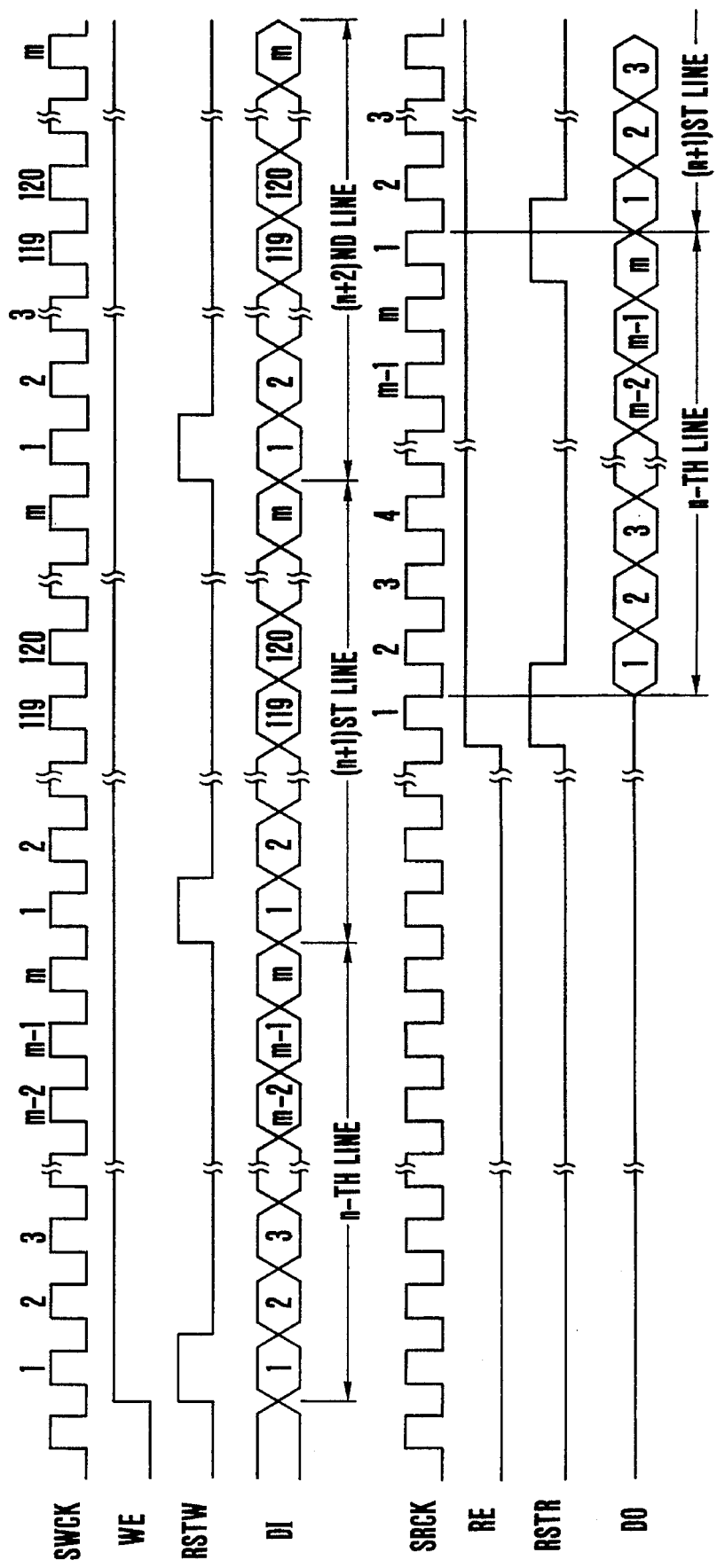
FIG. 4 is a timing chart showing the state of an operation to be performed in reading out an image signal for one field written in a memory element of one bank of the FIFO memory 18 of FIG. 1 while using a memory element of another bank as a 1H delay element.

FIG. 4 is a timing chart showing the state of operation of the embodiment performed by using the memory element of the other bank as the 1H delay element in reading the image signal for one field written in the memory element of one of the banks of the FIFO memory 18.

For example, for the period of one field during which image data for one field stored in the memory elements A and B of the first bank of the FIFO memory 18 is read out and supplied to a contact "a" of the switch SW3, the memory controller 28 causes the switch SW2 to be connected to its contact "c" so as to allow the image data outputted from the terminals DO of the memory elements A and B of the first bank to be supplied to the terminals DI of the memory elements C and D of the second bank.

At this time, the memory controller 28 supplies high-level control signals to the terminals WE of the memory elements C and D of the second bank and supplies reset pulses at intervals of 1H to the terminals RSTW of these memory elements. As a result, the image data read out from the memory elements A and B of the first bank is written into the memory elements C and D of the second bank in units of one horizontal scanning line.

After completion of writing the image data which is outputted from the memory elements A and B of the first bank and corresponds to the n-th horizontal scanning line into the memory elements C and D of the second bank, the memory controller 28 supplies high-level control signals to the terminals RE of the memory elements C and D of the second bank either at the same time as the start of writing into the memory elements C and D of the second bank the image data which is outputted from the memory elements A and B of the first bank and corresponds to the (n+1)st horizontal scanning line or until a 119th sample data is written in after the start of writing. Further, a reading action on the image data written in the memory elements C and D of the second bank is caused to begin by supplying the reset pulses to the terminals RSTR at intervals of 1H. By this action, the image data which corresponds to the n-th horizontal scanning line and is outputted 1H before from the memory elements A and B of the first bank can be read out from the memory elements C and D of the second bank. In other words, the image data outputted from the memory elements A and B of the first bank can be obtained from the memory elements C and D of the second bank as 1H delayed image data.

Further, with the memory elements A to D which form the FIFO memory 18 arranged to be capable of acting as described above, data writing and reading actions can be continuously carried out. Further, the data written in can be read out as often as desired after writing. Therefore, with the reset pulses arranged to be applied to the terminals RSTW and RSTR at arbitrary timing as shown in FIG. 4, the memory element can be caused to act as a delay element for delaying the input data any desired length of time, up to a maximum delay time of 262×262 clock pulses. For example, the memory element can be caused to act as a one-field delay element by applying a reset pulse to the terminal RSTR one vertical scanning period (one field period) after a reset pulse is applied to the terminal RSTW. The memory element also can be caused to act as a 1H delay element by applying a reset pulse to the terminal RSTR after the lapse of the period of 1H from a point of time at which a reset pulse is applied to the terminal RSTW.

In other words, as shown in FIG. 5 which shows a memory map, among the memory elements of the first and second banks, a storage area in which image data for one horizontal scanning line is first stored can be used as the 1H delay element.

Next, the simultaneous rearrangement process on the line-sequential color-difference signal and the dropout compensation process to be carried out by the reproducing apparatus of this embodiment are described as follows:

Referring to FIG. 2, after completion of writing an image signal (data) for one frame into the FIFO memory 18, the switch SW3 is first connected to its contact "a" in accordance with an instruction given from the memory controller 28. As a result, the image data for one field stored in the memory elements A and B of the first bank of the FIFO memory 18 begins to be read out. The image data read out from the memory elements A and B is supplied to the contact "a" of the switch SW3 and to a data extraction circuit 32. At a data extraction circuit 31, only the digital luminance data Y is extracted from the image data outputted from the switch SW3. The digital luminance data Y thus extracted is supplied to the D/A converter 19.

During the period during which the data is read out from the memory elements A and B of the first bank of the FIFO memory 18, the switch SW2 is connected to its contact "c" in accordance with an instruction given from the memory controller 28. The switch SW2 then causes the memory elements C and D of the second bank of the FIFO memory 18 to act as 1H delay elements. As a result, data which is obtained by delaying by 1H the data read out from the memory elements A and B of the first bank is outputted from the memory elements C and D of the second bank. The data outputs from the memory elements C and D are supplied to the contact "b" of the switch SW3 and to a data extraction circuit 33.

Therefore, the image data supplied from the memory elements A and B of the first bank to the data extraction circuit 32 and the image data supplied from the memory elements C and D of the second bank to the data extraction circuit 33 are thus deviating 1H from each other in time base. With the digital line-sequential color-difference data thus extracted at the two data extraction circuits 32 and 33, therefore, digital color-difference data R-Y and digital color-difference data B-Y are rearranged to be concurrent and simultaneous. The digital color-difference data R-Y and B-Y thus rearranged into a simultaneous state are supplied to a digital quadrature modulation circuit 30 to be quadrature-modulated into digital chrominance data C. The data C is supplied to the D/A converter 20.

Further, the data read out from the memory elements A and B of the first bank of the FIFO memory 18 is supplied also to the memory controller 28. The memory controller 28 shifts the connecting position of the switch SW3 from its contact "a" to its contact "b" for a period of time during which the data supplied from the memory elements A and B is at the value encoded as "0FFH" by the dropout encoding circuit 29 at the time of writing the data thus indicating a dropout occurrence. In this case, a dropout compensation is made by causing the data which is supplied from the memory elements A and B to the contact "a" of the switch SW3 and is thus indicating the dropout occurrence to be replaced with the data which is obtained 1H before and supplied from the memory elements C and D of the second bank to the contact "b" of the switch SW3.

During the period of making compensation for a dropout occurring as mentioned above, the switch SW2 is connected to its contact "d" for connection between the terminal DO and the terminals DI of the memory elements C and D of the second bank which are acting as 1H delay elements. Then, data read out from the memory elements C and D of the second bank as 1H delayed data is again written into the memory elements C and D of the second bank. With these memory elements C and D thus caused to act as cyclic delay elements, if any data read out from the memory elements A and B of the first bank happens to indicate a dropout occurrence, such data is prevented from being supplied to the memory elements C and D of the second bank which are acting as 1H delay elements.

Further, for the period during which the digital line-sequential color-difference data R-Y/B-Y is being read out from the memory elements A and B of the first bank, the memory controller 28 keeps the switch SW2 connected to its contact "c" without connecting it to the contact "d". Under this condition, the process of making dropout compensation by causing the memory elements C and D of the second bank to act as 1H delay elements is not performed for the digital line-sequential color-difference data. In that case, the simultaneous rearrangement process is carried out in the manner as described above without performing the dropout compensation process.

After completion of reading the image data for one field stored in the memory elements A and B of the first bank of the FIFO memory 18 as mentioned above, the switch SW3 is connected to its contact "b" in accordance with the instruction from the memory controller 28 and the image data for one field stored in the memory elements C and D of the second bank of the FIFO memory 18 begins to be read out. The image data thus read out from the memory elements C and D is supplied to the contact "b" of the switch SW3 and also to the data extraction circuit 33.

At the data extraction circuit 31, only the digital luminance data Y is extracted from the image data outputted from the switch SW3. The digital luminance data Y is supplied to the D/A converter 19.

While the data reading action on the memory elements C and D of the second bank of the FIFO memory 18 is in process, the switch SW1 is kept connected to its contact "c" by the instruction from the memory controller 28. This switch position causes the memory elements A and B of the first bank to serve as 1H delay elements. As a result, data obtained by delaying as much as 1H the data read out from the memory elements C and D of the second bank is outputted from the memory elements A and B of the first bank and supplied to the contact "a" of the switch SW3 and to the data extraction circuit 32.

Therefore, the time base of the image data supplied to the data extraction circuit 33 from the memory elements C and D of the second bank and that of the image data supplied from the memory elements A and B of the first bank to the data extraction circuit 32 differ by 1H from each other. Hence, the digital color-difference data R-Y and the digital color-difference data B-Y which have been in a line-sequential state are rearranged into a concurrent state by extracting the digital line-sequential color-difference data from the image data through the data extraction circuits 32 and 33. The digital color-difference data R-Y and B-Y thus obtained by this simultaneous rearrangement process are supplied to the quadrature modulation circuit 30 to be quadrature-modulated into digital chrominance data C. The digital chrominance data C is supplied to the D/A converter 20.

Further, the data read out from the memory elements C and D of the second bank of the FIFO memory 18 is supplied also to the memory controller 28. If the data supplied from the memory elements C and D of the second bank is found to have been encoded to show a dropout occurrence by the dropout encoding circuit 29 in writing the data, i.e., if the data is of the value "0FFH", as mentioned in the foregoing, the memory controller 28 replaces the dropout occurrence indicating data which is supplied from the memory elements C and D of the second bank to the contact "b" of the switch SW3 with the data which is obtained 1H before and is supplied from the memory elements A and B of the first bank to the contact "a" of the switch SW3 by shifting the connecting position of the switch SW3 from its contact "b" to the contact "a" and keeps the switch SW3 there as long as the data shows the dropout occurrence. The dropout compensation process is carried out in this manner.

During the process of the dropout compensation in the above-stated manner, the switch SW1 is connected to its contact "d" to connect the terminals DO of the memory elements A and B of the first bank which are acting as the 1H delay elements to their terminals DI, so that the data obtained 1H before is read out from the memory elements A and B of the first bank and the data thus read out is again written into the memory elements A and B of the first bank to make the memory elements A and B of the first bank serve as cyclic delay elements. This switching action thus prevents the dropout occurrence indicating data which is read out from the memory elements C and D of the second bank from being supplied to the memory elements A and B of the first bank while they are acting as the 1H delay elements.

Further, during the process of reading out the digital line-sequential color-difference data R-Y/B-Y from the memory elements C and D of the second bank, the memory controller 28 causes the switch SW1 to be kept connected to its contact "c" instead of the contact "d". Therefore, the dropout compensation process which is performed by using the memory elements A and B of the first bank as 1H delay elements (or lines) is not performed for the digital line-sequential color-difference data. As mentioned in the foregoing, for the line-sequential color-difference data, the simultaneous rearrangement process is performed in place of the dropout compensation process.

As mentioned above, the reproducing apparatus of this embodiment is arranged not to perform the dropout compensation process for the line-sequential color-difference signal. However, the line-sequential color-difference signal is recorded in a deeper part of the video floppy disc than the luminance signal. The line-sequential color-difference signal is thus affected by a dropout occurrence to a less degree than the luminance signal. Therefore, no problem results from the omission of the dropout compensation process.

Further, the reproducing apparatus of this embodiment is capable of obtaining image data for one frame from image data for one field written in the memory elements of one of the banks of the FIFO memory 18. This operation is performed as follows: After the image data for one field has been written into the memory elements of one of the banks, the memory elements of the other bank are caused to act as 1H delay elements while the image signal (data) for one field is in process of being read out from the memory elements of the one of banks. Then, an interpolation process can be carried out by using the 1H delay elements in such a manner as to form an image signal for one frame from the image data for one field read out from the memory elements of the one of the banks of the FIFO memory 18.

Referring to FIG. 2, in carrying out the interpolation process to form image data for one frame from, for example, the image data for one field written in the memory elements A and B of the first bank of the FIFO memory 18, the switch SW3 is first connected to its contact "a" in accordance with the instruction of the memory controller 28 after completion of writing the image data for one field into the memory elements A and B of the first bank of the FIFO memory 18. After that, the image data for one field stored in the memory elements A and B of the first bank of the FIFO memory 18 commences to be read out. The image data thus read out from the memory elements A and B is supplied to the contact "a" of the switch SW3 and also to an addition circuit 34 and the data extraction circuit 32.

Further, while the data is in process of being read out from the memory elements A and B of the first bank of the FIFO memory 18, the switch SW2 is connected to its contact "c" in accordance with the instruction of the memory controller 28 to render the memory elements C and D of the second bank of the FIFO memory 18 operable as the 1H delay elements. As a result, the data read out from the memory elements A and B of the first bank is delayed by 1H and is outputted from the memory elements C and D of the second bank. The delayed data thus obtained is supplied to the contact "b" of the switch SW3 and also to the addition circuit 34 and the data extraction circuit 33.

Therefore, at the addition circuit 34, the time base of the image data supplied from the memory elements A and B of the first bank and that of the image data supplied from the memory elements C and D of the second bank deviate by 1H from each other. The interpolation process is therefore carried out to form interpolation image data at the addition circuit 34 by taking the arithmetic means of the two image data inputs to the circuit 34. The interpolation image data thus obtained is supplied to the contact "c" of the switch SW3.

Then, in accordance with an instruction from the memory controller 28, the connecting position of the switch SW3 is switched between the contacts "a" and "c" at intervals of one field period. By this switching, the image data read out from the memory elements A and B of the first bank of the FIFO memory 18 and the interpolation image data outputted from the addition circuit 34 are alternately outputted from the switch SW3 at intervals of one field period. At the data extraction circuit 31, only the digital luminance data Y is extracted from the image data thus obtained from the switch SW3. As a result, digital luminance data Y for one frame is formed through the interpolation process from the digital luminance data Y for one field. The digital luminance data for one frame thus formed is supplied to the D/A converter 19.

In a case where the interpolation process is to be carried out by forming image data for one frame from the image data for one field written in the memory elements C and D of the second bank of the FIFO memory 18, instead of the image data written in the memory elements A and B of the first bank, the embodiment operates as follows: After completion of writing the image data for one field into the memory elements C and D of the second bank of the FIFO memory 18, the switch SW3 is first connected to its contact "b" in accordance with the instruction of the memory controller 28. When the image data for one field stored in the memory elements C and D of the second bank of the FIFO memory 18 commences to be read out, the image data thus read out from the memory elements C and D is supplied to the contact "b" of the switch SW3 and also to the addition circuit 34 and the data extraction circuit 33. While the data reading from the memory elements C and D of the second bank of the FIFO memory 18 is in process, the switch SW1 is kept connected to its contact "c" by the instruction of the memory controller 28. The memory elements A and B of the first bank of the FIFO memory 18 are thus caused to act as the 1H delay elements. As a result, the memory elements A and B of the first bank come to output delayed data which is first outputted from the memory elements C and D of the second bank and delayed by 1H. The delayed data is supplied to the contact "a" of the switch SW3 and also to the addition circuit 34 and the data extraction circuit 32.

At the addition circuit 34, the time base of the image data supplied from the memory elements C and D of the second bank and that of the image data supplied from the memory elements A and B of the first bank deviate by 1H from each other. Therefore, the interpolation process can be accomplished by taking the arithmetic means of the two image data inputs. An interpolation image data thus formed is supplied to the contact "c" of the switch SW3. Then, the connecting position of the switch SW3 is switched between the contacts "b" and "c" at intervals of one field period in accordance with the instruction from the memory controller 28. This switching causes the image data read out from the memory elements C and D of the second bank of the FIFO memory 18 and the interpolation image data outputted from the addition circuit 34 to be alternately outputted from the switch SW3 at intervals of one field period. Then, at the data extraction circuit 31, only the digital luminance data Y is extracted from the image data outputted from the switch SW3. As a result, the digital luminance data Y for one frame is obtained from the digital luminance data Y for one field by the interpolation process. The digital luminanice data Y for one frame is supplied to the D/A converter 19.

The reproducing apparatus of this embodiment is arranged to perform the interpolation process only for the digital luminance data included in the image data. The interpolation process is not performed for the digital line-sequential color-difference data included in the image data. Instead of performing the interpolation process, the digital color-difference data R-Y and the digital color-difference data B-Y included in the digital line-sequential color-difference data are rearranged to be concurrent, at the data extraction circuits 32 and 33, by extracting the digital line-sequential color-difference data respectively from the image data supplied from the memory elements A and B of the first bank and the image data supplied from the memory elements C and D of the second bank, which have their time bases deviating as much as 1H from each other. The digital color-difference data R-Y and B-Y thus obtained through the data extraction circuits 32 and 33 are quadrature-modulated into digital chrominance data C by the digital quadrature modulation circuit 30. The data C thus obtained is supplied to the D/A converter 20.

Further, while the interpolation process is being carried out in the above-stated manner, the dropout compensation process is also carried out. However, the dropout compensation process is performed in the same manner as described in the foregoing, details of it are omitted from description.

As described above, the reproducing apparatus of this embodiment is arranged to write the image signal for one frame reproduced from the video floppy disc by using the digital signal processing part which is provided with the FIFO memory. The FIFO memory consists of two memory element banks. In writing the image signal for one frame, an image signal for one field is written into each of the two memory element banks by switching the memory element bank from one over to the other. The image signal for one frame is thus temporarily stored in the two memory element banks. The image signal for one frame thus stored is read out as follows: While the image signal for one field is in process of being read out from one of the two memory element banks, the image signal read out from the one of the memory element banks is transferred to the other memory element bank in such a way as to use a part of the storage area of the other memory element bank as a 1H (one horizontal scanning period) delay element. The dropout compensation process, the simultaneous rearrangement process for the line-sequential color-difference signal, the interpolation process for forming an image signal for one frame from an image signal for one field, etc., thus can be accomplished by using the 1H delay element. The arrangement dispenses with any expensive delay element that has heretofore been necessary for these processes. The reproducing apparatus thus can be simply arranged to permit cost reduction.

In the case of the embodiment described, this invention is applied to a reproducing apparatus wherein a field type magnetic head is employed as the magnetic head 4 and is arranged to trace one track formed on the video floppy disc 1 and to reproduce a signal recorded in the track. However, this invention is applicable also to a reproducing apparatus having a frame type head consisting of two magnetic heads which are arranged to individually reproduce signals recorded in tracks by simultaneously tracing two adjacent tracks formed on the video floppy disc 1. In that case, the reproducing apparatus is provided with a head change-over switch which is arranged such that the signals reproduced by the two magnetic heads forming the frame type head from the two adjacent tracks on the video floppy disc 1 are alternately supplied to the amplifier 6 shown in FIG. 1 by switching these signals from one over to the other tot every one field period. This arrangement obviates the necessity of moving the magnetic head 4 by the head moving mechanism 5 in reproducing an image signal for one frame recorded in two adjacent tracks on the video floppy disc 1.

In the foregoing, the embodiment has been described as in the mode of reproducing the image signal for one frame (consisting of two fields) recorded in the frame recording mode by recording the signal for one field in each of two adjacent tracks among a plurality of circular tracks concentrically formed on the video floppy disc. However, in cases where an image signal for one frame is to be outputted by reproducing an image signal for one field which is recorded in the field recording mode in one of the tracks formed on the video floppy disc and by carrying out an interpolation process, the image signal for one frame can be formed by carrying out the interpolation process in the same manner as described in the foregoing.

As apparent from the foregoing, the problems of the prior art can be solved by the embodiment described. In accordance with this invention, an image signal processing apparatus can be simply arranged at a low cost to be capable of carrying out various processes on an image signal by delaying the signal without recourse to any delay element that has been indispensable for the conventional apparatus and arranged exclusively for an image signal delaying process which is necessary in carrying out various signal processing actions.

What is claimed is:

1. An image signal processing apparatus, comprising:
   a) reproduction means for reproducing and outputting every other field an image signal from a recording medium on which the image signal is recorded;
   b) reproduction mode command means having both a frame reproduction mode for reproducing and outputting an image signal for one frame recorded in said recording medium by said reproducing means and a field reproduction mode for forming and outputting an image signal for the frame from the image for the one field, wherein a command is performed so as to act a reproduction operation according to either of the reproducing modes;
   c) a first-in first-out memory capable of memorizing the image signal output from the reproduction means for every one field; and
   d) image signal output means having both a first operation mode to cause it to act as a memory for one-vertical scanning period of an image signal input by changing the writing and read-out operations of the first-in first-out memory alternately with a one-vertical scanning periodic frequency of the image signal and a second operation mode to cause it to act as a memory for a one-horizontal scanning period of the image signal input by changing the writing and read-out operation of the first-in first-out memory alternately with a one-horizontal scanning periodic frequency of the image signal, wherein, in a case that frame production mode is being commanded by said reproduction mode command means, it causes the first-in first-out memory to act as the one-vertical scanning periodic memory according to said first operation mode to read out and output every other field the image signal for one field recorded in the first-in first-out memory once after recording in the first-in first-out memory the image signal for one field outputted from said reproduction means and, in a case that the field reproduction mode is being commanded in said reproducing mode command means, it causes the first-in first-out memory to act as the one-horizontal scanning periodic memory according to said second operation mode for outputting and interpolated image signal formed by means of the image signal for one field outputted from said reproduction means which is delayed by one-horizontal scanning period by the first-in first-out memory.

2. An apparatus according to claim 1, wherein said first-in first-out memory includes:
   a) a first first-in first-out memory capable of memorizing the image signal output from the reproduction means for one field;
   b) a second first-in first-out memory capable of memorizing the image signal output from the reproduction means for one field; and
   c) a switch for supplying the image signal output from the reproduction means alternately every one field to the first and second first-in first-out memories by switching over between the first and second first-in first-out memories.

3. An apparatus according to claim 2, wherein the second first-in first-out memory changes alternately the writing and read-out operations of the image signal with the one horizontal scanning period of the image signal and delays the image signal being input by one horizontal scanning period and outputs the delayed image signal, and the image signal output means memorizes the image signal for one field output from the reproduction means once in the first first-in first-out memory, and reads out the image signal for one field from the first first-in first-out memory, and the image signal read out from the first first-in first-out memory is delayed by one horizontal scanning period by the second first-in first-out memory, and the image signal read out from the first first-in first-out memory and the image signal delayed one horizontal scanning period by the second first-in first-out memory are arithmetically averaged to form and output an interpolated image signal.

4. An apparatus according to claim 1, wherein the image signal includes a color image signal composed of a luminance signal and a chrominance color component signal.

* * * * *

UNITED STATES PATENT AND TRADEMARK OFFICE
CERTIFICATE OF CORRECTION

PATENT NO.  : 5,508,813
DATED       : April 16, 1996
INVENTOR(S) : Yuji Sakaegi, et al.

It is certified that error appears in the above-indentified patent and that said Letters Patent is hereby corrected as shown below:

Col. 1, delete lines 8-9.

Col. 1, line 13, after "Invention" insert -- This invention relates to an image signal processing apparatus arranged to process an image signal --.

Col. 15, line 2, change "tot" to -- for --.

Signed and Sealed this

Twenty-second Day of April, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,508,813

DATED : April 16, 1996

INVENTOR(S): Yuji Sakaegi, et al.

It is certified that error appears in the above-identified patent and that said Letters Patent is hereby corrected as shown below:

On the cover page, Item [22], change "June 19, 1995" to -- June 2, 1995 --.

Signed and Sealed this

Thirteenth Day of May, 1997

Attest:

Attesting Officer

BRUCE LEHMAN

Commissioner of Patents and Trademarks